F. L. McGAHAN.
LOCOMOTIVE.
APPLICATION FILED JAN. 3, 1918.

1,292,399.

Patented Jan. 21, 1919.
13 SHEETS—SHEET 1.

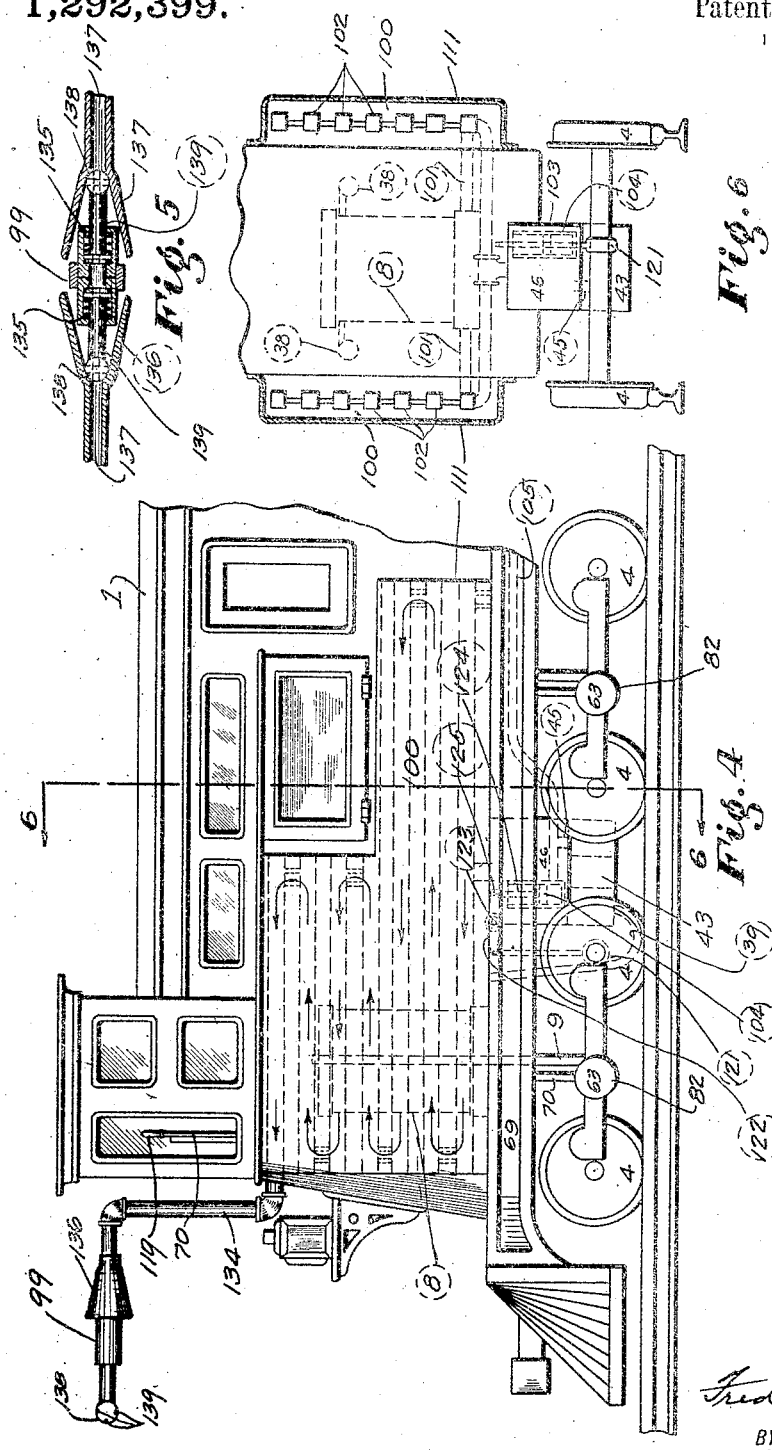

F. L. McGAHAN.
LOCOMOTIVE.
APPLICATION FILED JAN. 3, 1918.
1,292,399.
Patented Jan. 21, 1919.
13 SHEETS—SHEET 4.
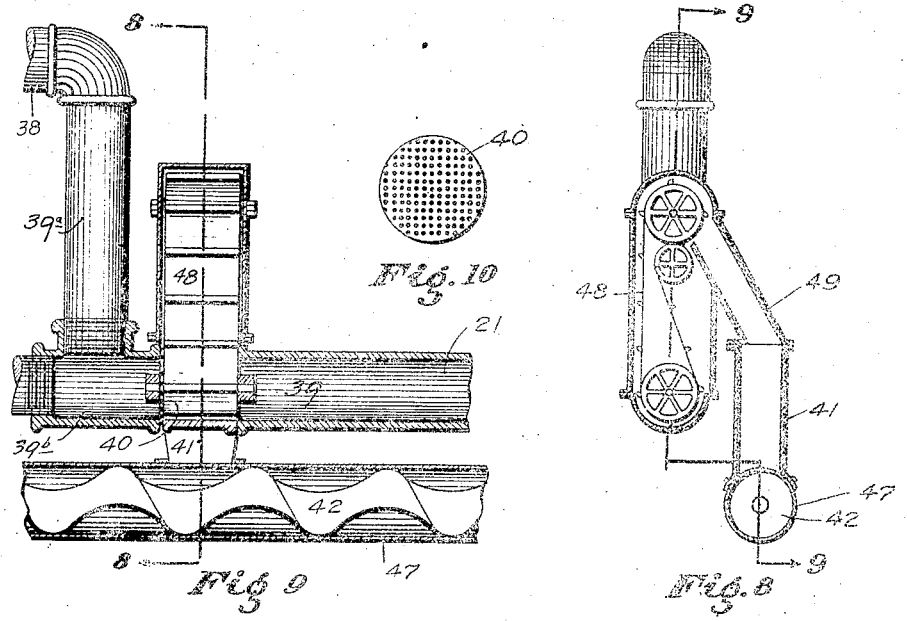
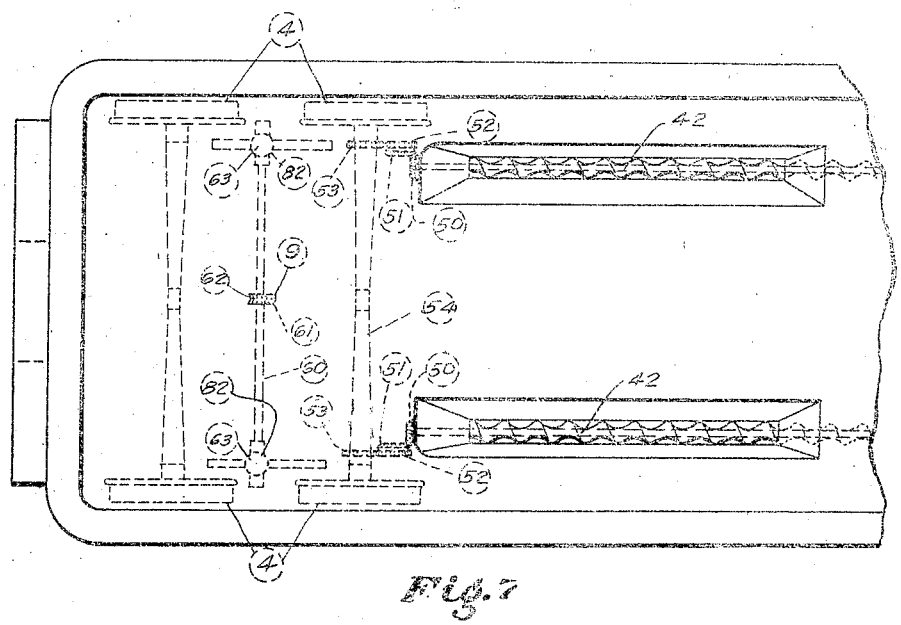
INVENTOR:
Frederick L. McGahan
BY Hugh K. Wagner
ATTORNEY

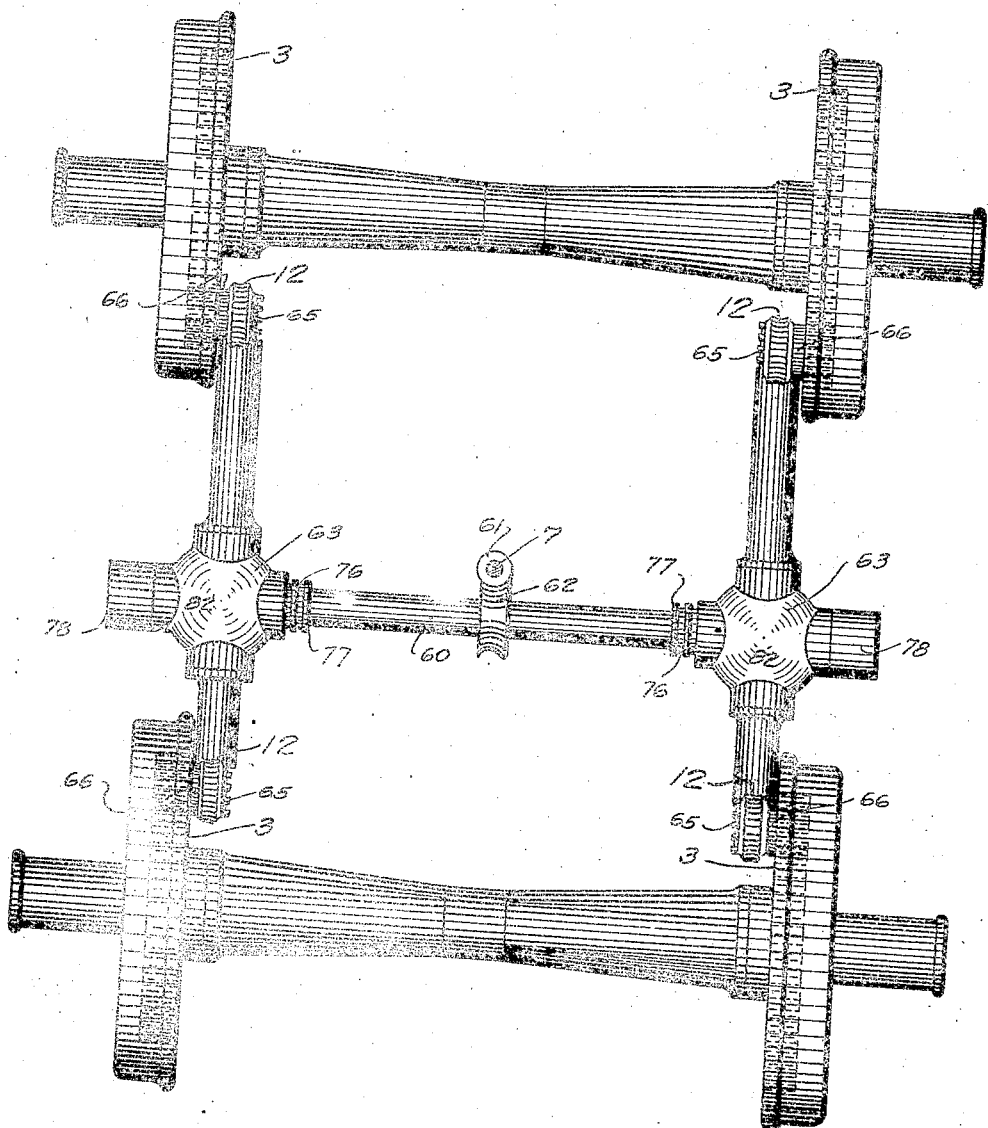

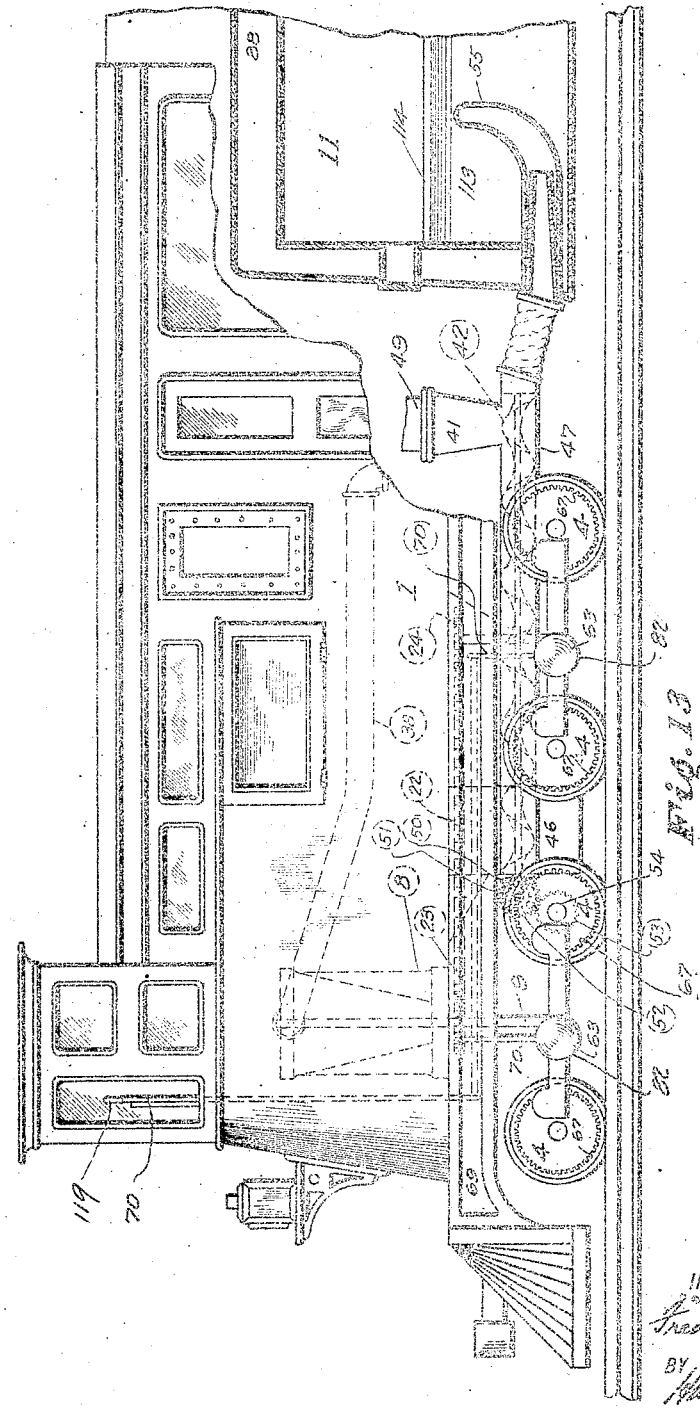

F. L. McGAHAN.
LOCOMOTIVE.
APPLICATION FILED JAN. 3, 1916.
1,292,399.
Patented Jan. 21, 1919.
13 SHEETS—SHEET 8.
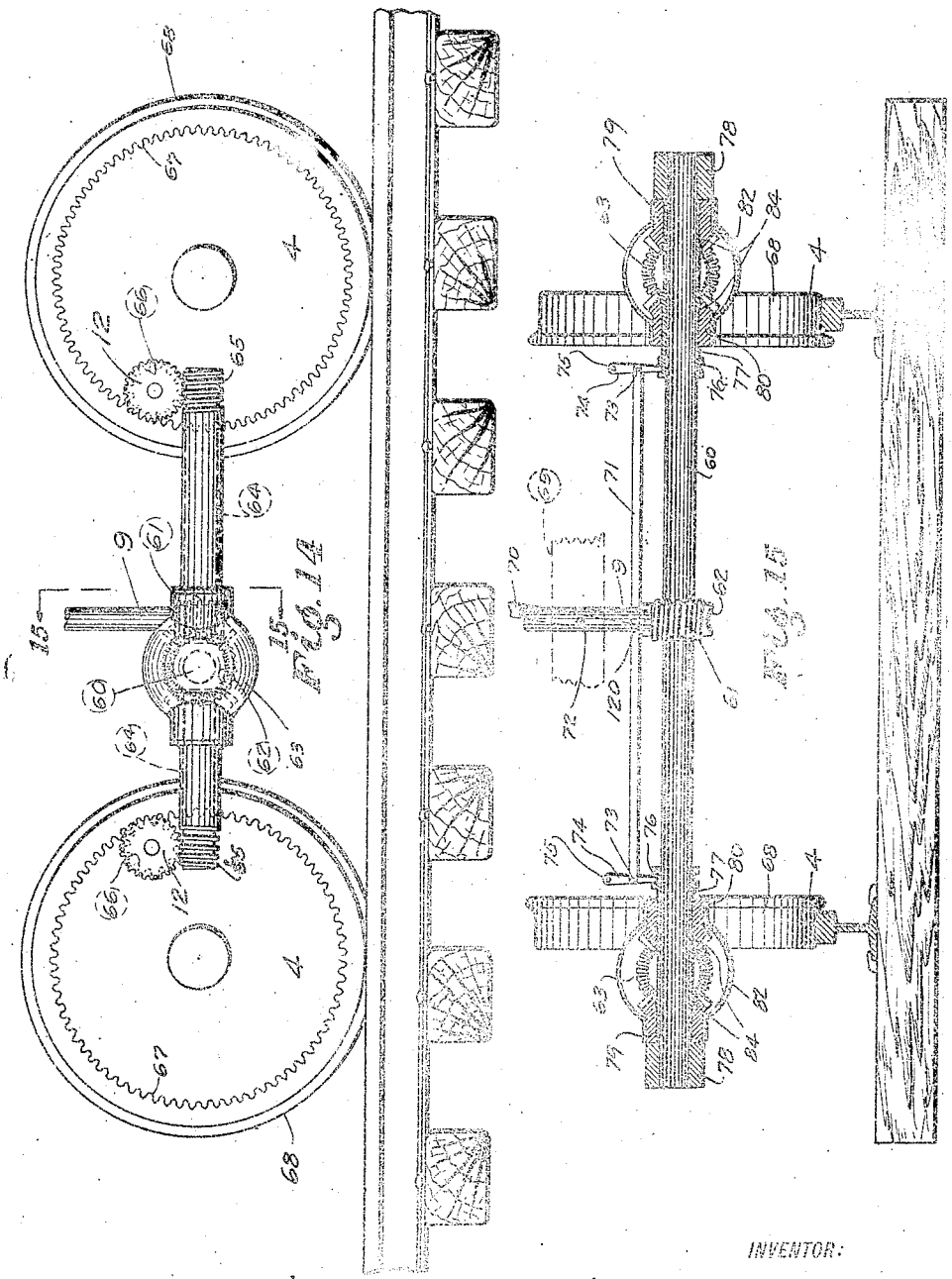
INVENTOR:
Francis L. McGahan
ATTORNEY.

F. L. McGAHAN.
LOCOMOTIVE.
APPLICATION FILED JAN. 3, 1918.
1,292,399.
Patented Jan. 21, 1919.
13 SHEETS—SHEET 10.
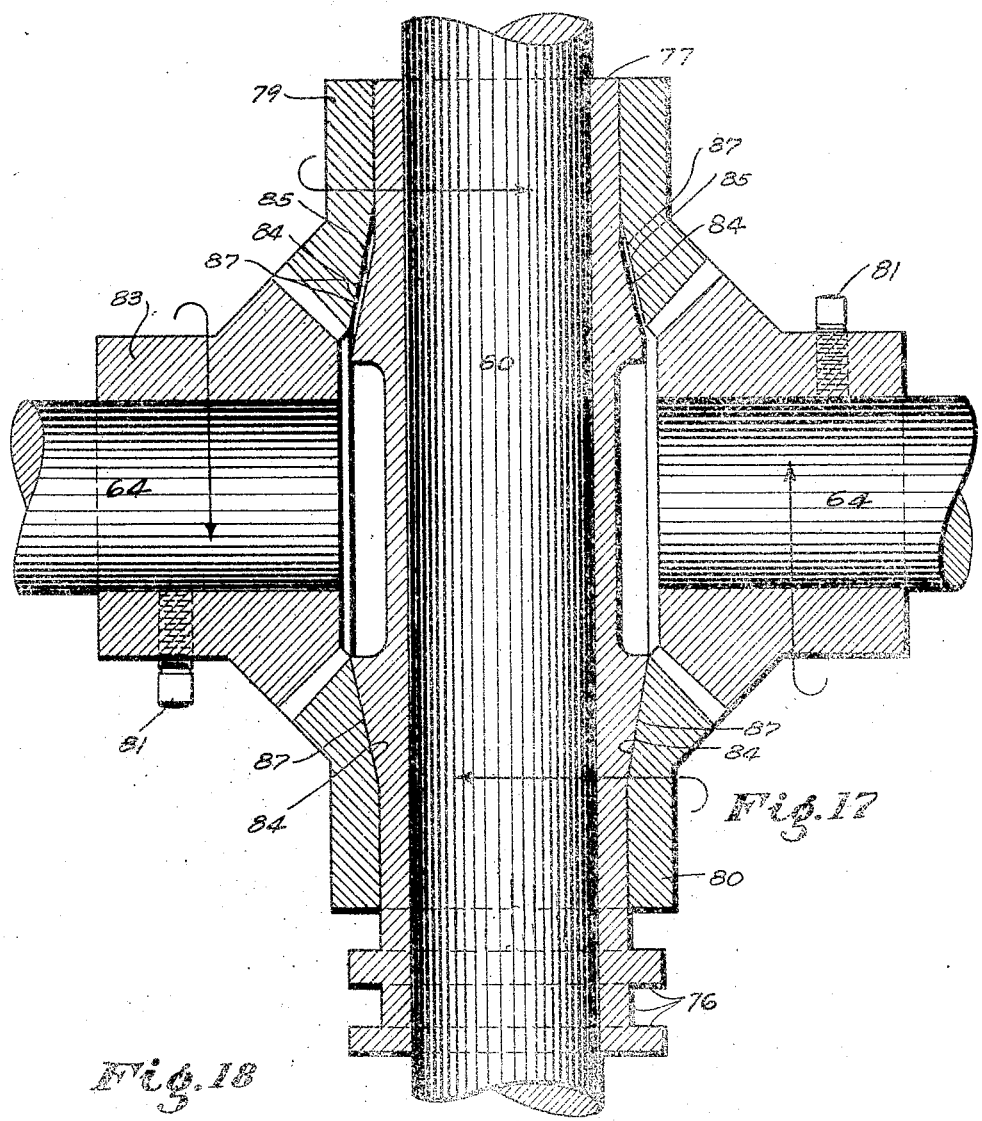
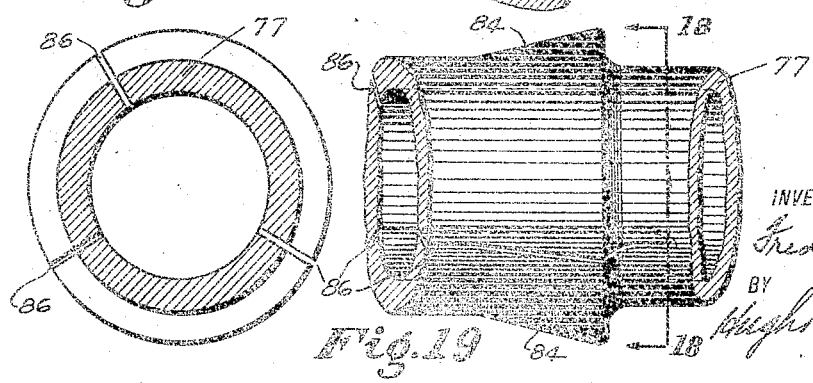
INVENTOR:
Frederick L. McGahan
BY
Hugh N. Wagner
ATTORNEY F. L. McGAHAN.
LOCOMOTIVE.
APPLICATION FILED JAN. 3, 1918.

1,292,399.

Patented Jan. 21, 1919.
13 SHEETS—SHEET 11.

INVENTOR:
Frederick L. McGahan,
BY
Hugh K. Wagner
ATTORNEY.

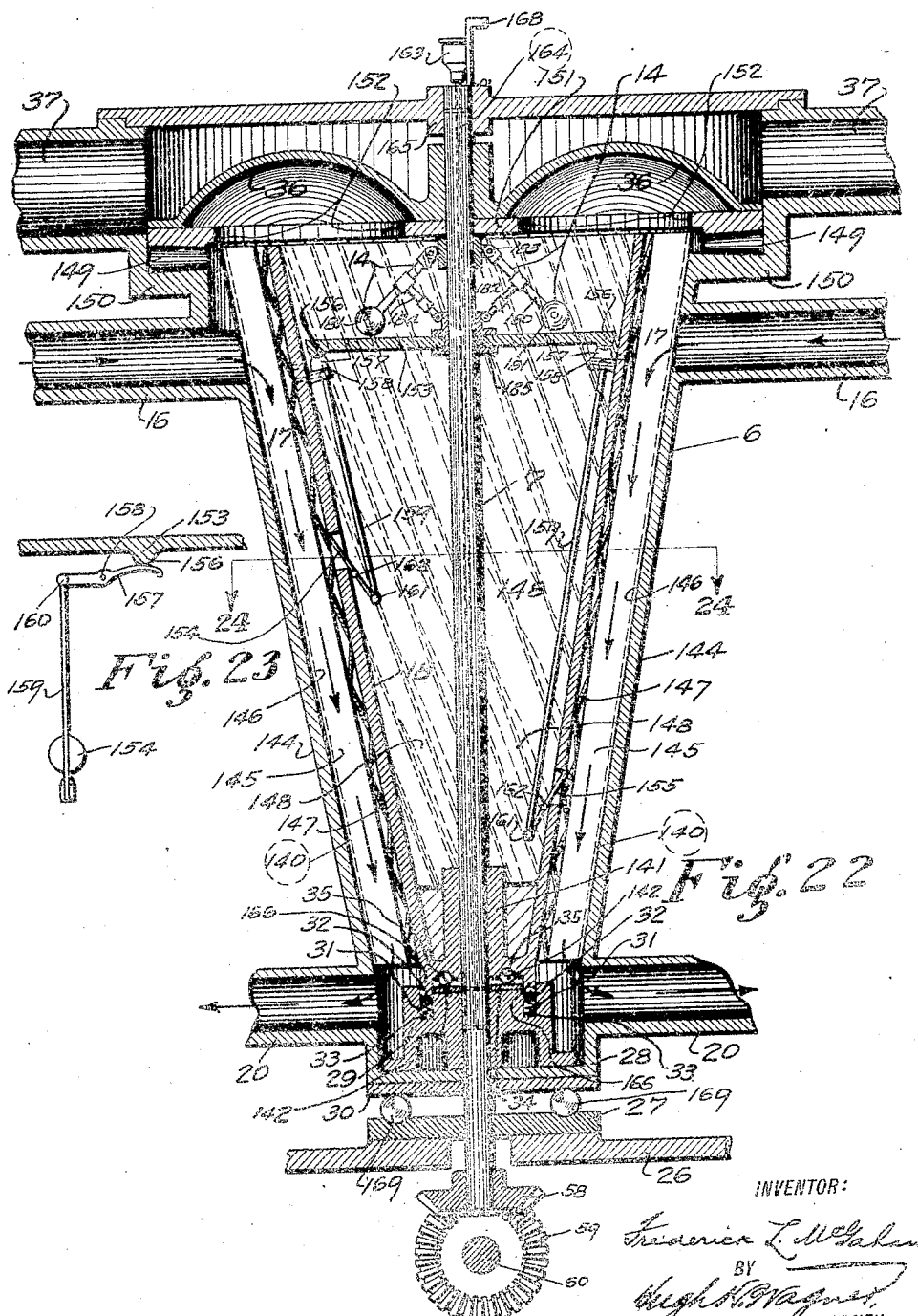

F. L. McGAHAN.
LOCOMOTIVE.
APPLICATION FILED JAN. 3, 1918.
1,292,399.
Patented Jan. 21, 1919.
13 SHEETS—SHEET 13.
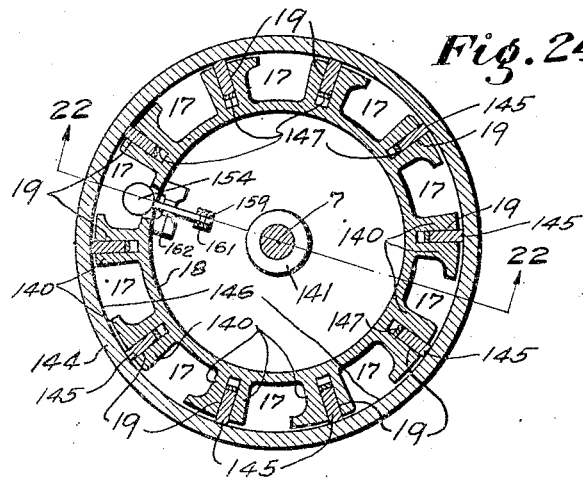
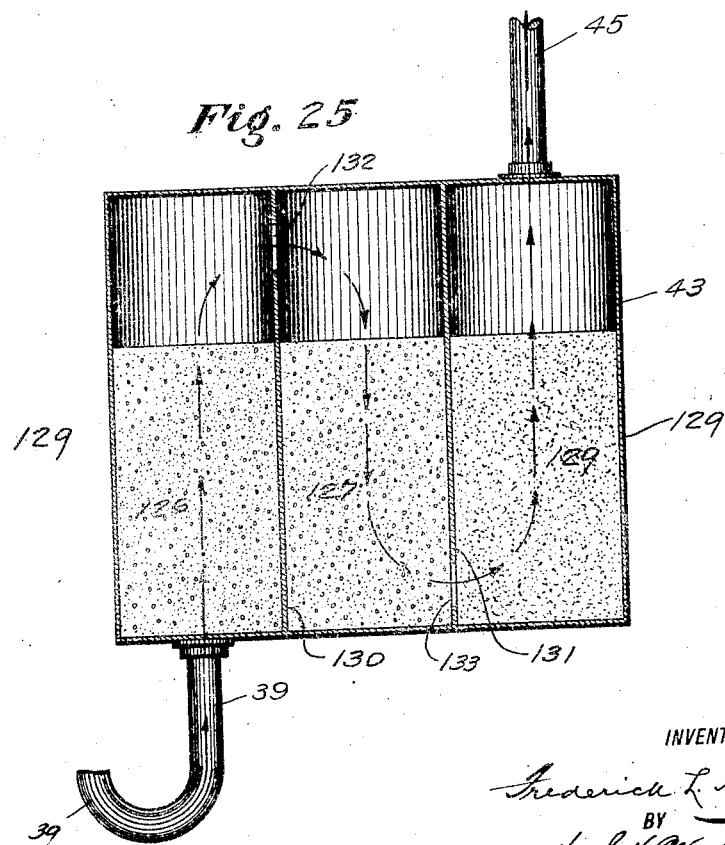
INVENTOR:
Frederick L. McGahan,
BY
Hugh K. Wagner
ATTORNEY

UNITED STATES PATENT OFFICE.

FREDERICK L. McGAHAN, OF LOS ANGELES, CALIFORNIA.

LOCOMOTIVE.

1,292,399.

Specification of Letters Patent.

Patented Jan. 21, 1919.

Application filed January 3, 1918. Serial No. 210,146.

*To all whom it may concern:*

Be it known that I, FREDERICK L. MC-GAHAN, a citizen of the United States, residing at the city of Los Angeles, in the county of Los Angeles and State of California, have invented certain new and useful Improvements in Locomotives, of which the following is a specification.

This invention relates to railway locomotives, and in part consists of the application of the principle of the steam turbine to locomotive driving and constructions suitable for such application, and by which more power is applied to the said driving not only because of the use of the said turbines as part of the driving mechanism but, also, because of the application of the power to a plurality of wheel-groups, which results in greater power being exerted upon the train by the locomotive. All this is accomplished with an economy of steam, not only because the steam is used three times for power and afterward for heating the train, but, also, because the herein-described mechanism enables the derivation of power from steam of lower pressure than is now useful for that purpose, whereby, as may be said, all the power of the steam (instead of, as now, only part of its power) is utilized. Moreover, this mechanism enables the reheating and superheating of steam in its ordinary course of being repeatedly used, which reheating and superheating is produced without additional firing, fuel, or the like. Furthermore, this apparatus eliminates wasteful and objectionable sulfur gas, smoke, sparks, and cinders by drawing the same out of the firebox and returning the solid particles thereto for further combustion.

Other economies, advantages, improvements, and inventions will hereinafter appear.

The steam turbines herein described and shown are of the radial impulse type, which is the preferred form in this invention, but other forms may be used.

In the accompanying drawings forming part of this specification and in which like numbers of reference denote like parts wherever they occur, Figure 1 is a side elevation of the quadruple-driven locomotive the subject-matter of this invention;

Fig. 4 is a fragmental side elevation showing in dotted lines the condensing coils;

Fig. 5 is a horizontal section through the car-to-car steam-coupling;

Fig. 6 is a fragmental section on the line 6—6 in Fig. 4;

Fig. 7 is a plan view of the tender, illustrating the screw of the automatic coal-feed;

Fig. 8 is a section on the line 8—8 in Fig. 9;

Fig. 9 is a vertical sectional view of the exhaust-separator, taken on the line 9—9 in Fig. 8;

Fig. 10 is a plan view of the separating screen;

Fig. 12 is a similar view showing the gear driving-mechanism on the flange side of the wheels;

Fig. 13 is a fragmental side elevation (partly in section and on an enlarged scale) of the tender end of the locomotive;

Fig. 14 is a side elevation of the pony and tender truck driving mechanism;

Fig. 15 is a section on the line 15—15 in Fig. 14;

Fig. 17 is a sectional view through the driving gears, being taken on a line horizontally and longitudinally through the same;

Fig. 18 is a section on the line 18—18 in Fig. 19;

Fig. 19 is a fragmental side elevation of the spring-clutch;

Fig. 22 is a vertical section of the water-spreader (or steam-turbine), taken on the line 22—22 in Fig. 24;

Fig. 23 is a detail of the internal valves of the water-spreader;

Fig. 24 is a section on the line 24—24 in Fig. 22; and

Fig. 25 is a sectional view through the water-filter.

Figure 1:
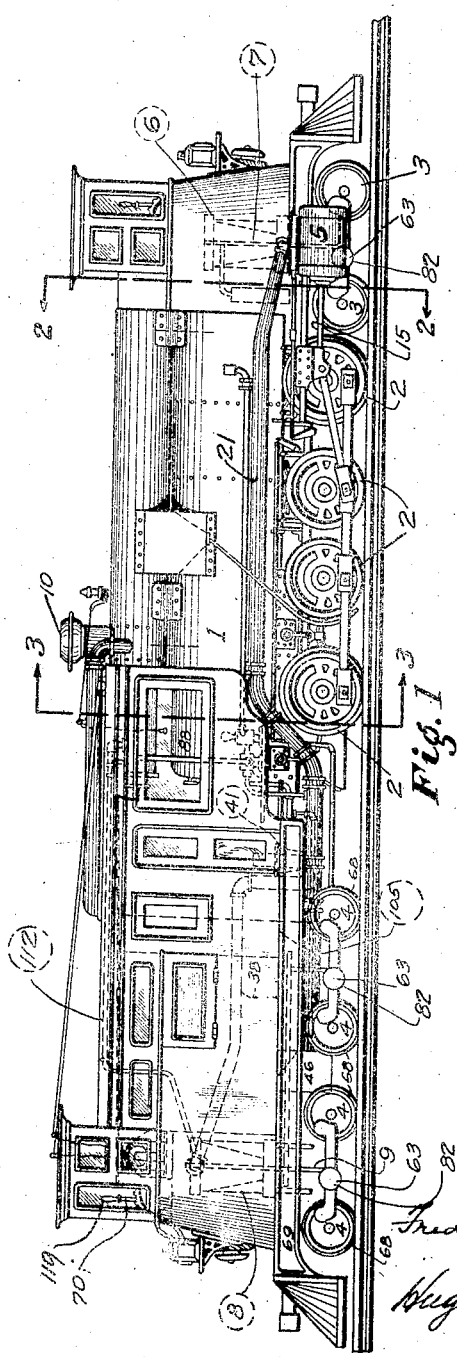
Figure 2:
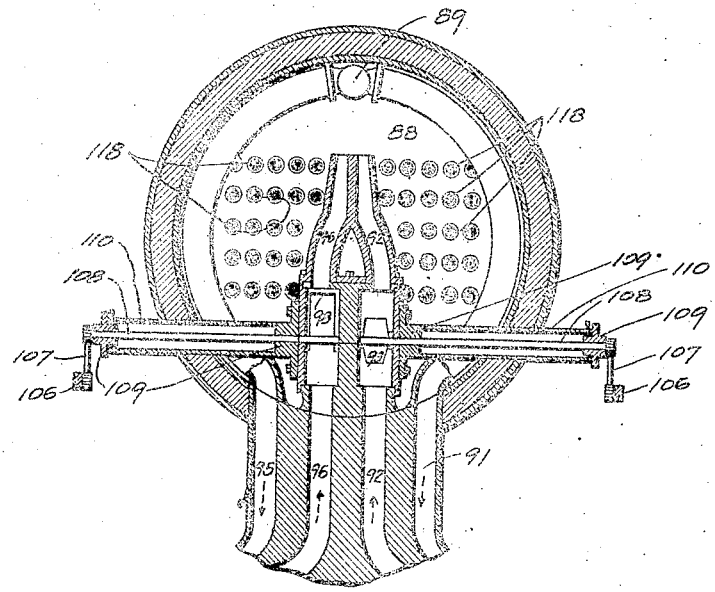
Fig. 2 is a section on the line 2—2 in Fig. 1.

The locomotive 1 is provided with the customary driving-wheels 2 and forward truck-wheels 3. Truck-wheels 4 on the tender (which tender is connected with the locomotive) and the said truck-wheels 3 are driven by means hereinafter described, while driving-wheels 2 are driven from cylinder 5 in the usual manner. The tender truck-wheels are in two sets, one set being driven by the other. Thus it will be seen that a quadruple-drive is applied to the locomotive, the same steam being used for all, and may be afterward used for heating the train. By the system herein described a greater proportion of the energy of the steam is utilized for driving purposes than is attained in prior locomotives, so much so that this apparatus derives driving force from the steam until the steam is reduced to only four or five pounds' pressure, after which it may be used for heating, as above stated.

A turbine 6, which rotates the shaft 7, drives the truck-wheels 3; and the turbine 8, which rotates the shaft 9, drives the truck-wheels 4. Both these turbines are of the same construction, which is original and itself a part of this invention as well as in combination with other features of the locomotive and of the train. The locomotive 1 is adapted to travel in either direction, which is particularly true in view of the location of one of the said turbines at each end thereof.

The smoke stack 10 will normally not be used, because of the draft of smoke and cinders as hereinafter described and the return of the cinders to the fire-box 11 by the automatic stoker hereinafter described and the mixture of the smoke with the steam in the turbine 6.

Turbines 6 and 8 may be provided with governors 13 either of the conventional type indicated in Fig. 1 or with the original kind 14 shown in Fig. 22.

The initial superheated steam is conveyed from the boiler 88 through the manifold or divider 89 to and through the pipes 95 and 91 to both sides of the locomotive and admitted to cylinder 5 and after said steam has been used in cylinder 5 to drive the piston rod 15 and thus the main driving wheels 2 in the customary manner, the steam exhausts from said cylinder 5 into the passages 96 and 92, leading to pipes 16. Said passages are conveniently connected to the intake pipes 16 of the turbine 6, therefore the pony truck turbine 6 uses an intermediate pressure of steam, which is the exhaust from cylinder 5. This steam passes through pipe 16 and thence into the chamber 17 surrounding the revoluble cone 18 having helical grooves (hereinafter described in detail in connection with Fig. 24) in its surface adapted to receive frictional and impelling contact from the incoming steam, thereby deriving its rotary motion and driving shaft 7 which is connected to trucks 3.

The turbine 6 can be cut in or out by use of valves 98 and 93, which are operated from the cabs through reach-rods 106 pivotally mounted to levers 107, said levers 107 and valves 93 and 98 being secured through keys to valve-rod 108. Valve-rods 108 are rotatably mounted in castings 109 at each end of housing 110.

Having thus energized the turbine 6, the steam passes through pipes 20 and long pipe 21 to energize turbine 8, the rotary motion of cone 18 in which rotates shaft 9, which thereby drives truck-wheels 4, the righthand set of which in Fig. 1 is driven from the lefthand set in the said figure by the sprocket-chain 22 (see Fig. 16) actuated by the sprocket wheel 23, which drives the sprocket-wheel 24 and thereby the shaft 25 and thereby the set of trucks not directly driven by shaft 9. Driving of the said wheels may be accomplished in any other suitable manner, as, for instance, by beveled gears, a universal shaft, or the like. It should be understood that the action of turbine 8 on shaft 9 and trucks 4 is the same as that of turbine 6 on shaft 7 and trucks 3, with the exception that truck-wheels 4 are a double set as compared with truck-wheels 3.

Each cone 18 is of substantially the same construction and mounted and connected in substantially the same manner. Upon the support 26 above the trucks is fastened a ball-race 27, which bears the bottom of cup 28, forming an extension beyond chamber 17. A pedestal 29 is fixed in cup 28. The shaft 7 turns freely in pedestal 29 and plate 30 and cup 28, so that when the truck-wheels are rounding a curve the ball-race 27 and plate 26 revolve underneath the turbine. Groove 31 in pedestal 29 contains a gasket 32, spring pressed at 33, to prevent leakage along shaft 7. A ball-race 34 coöperates with groove 35 in the base of cone 18, thereby allowing the same freely to rotate as impelled by the action of the steam admitted through pipes 16 upon its helical grooves, and thereby rotating shaft 7, to which cone 18 is keyed or otherwise fixed.

Fans 36 draw hot air, smoke, and cinders through pipes 37 from the top of the fire-box 11, and thereby the steam that enters chamber 17 through pipes 16 is reheated or superheated. With the steam as hereinbefore described the cinders pass through pipes 20 and pipe 21 toward turbine 8, after which they are all carried by steam pressure and fan action into pipe 39. The latter pipe contains the spark-arrester 40, which causes the stoppage of the cinders and, in a manner about to be described, their deposit through hopper 41 upon endless conveyer 42, which carries the cinders back to fire-box 11. The steam continues on through pipe 39ª to the turbine 8. The object of this vertical pipe 39ª is to provide means of separation of the steam from the water, i. e., to take the humidity out of the steam which is actuated by gravity, the water dropping to the bottom of the T 39ᵇ and flowing to the filtering mechanism 43.

This turbine 8 may be run independent of low pressure steam as it has two connections. The one connection to the pipe 38 which is the low pressure steam pipe and the pipe 112 which is connected directly to the superheating coils 118. Thus when the engine is standing still and turbine 8 is desired to run for the making of electricity, pumping air, or some other reason, by turning off steam from pipe 38 and cutting in high pressure steam from pipe 112 this object can be accomplished. After the steam has passed through the turbine 8 in its specific operation it enters the radiator or condenser 100 hereinafter described, through which it passes and emerges as water freed by the filter 43 from the last traces of cinders or grit, then flowing through pipe 45 to the water-tank 46 of the tender. Conveyer 42 is located in pipe 47, to an opening in the top of which hopper 41 directly leads. Elevator 48 is so arranged as to carry away all cinders stopped by spark-arrester 40 and to dump them into run 49, which leads to hopper 41 (see Figs. 8 and 9).

Figure 3:
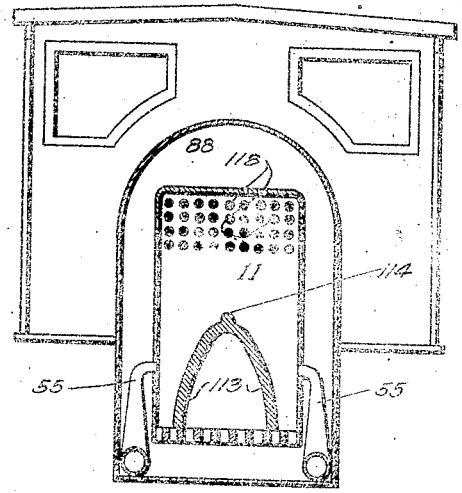
Fig. 3 is a section on the line 3—3 in Fig. 1.
Figure 20:
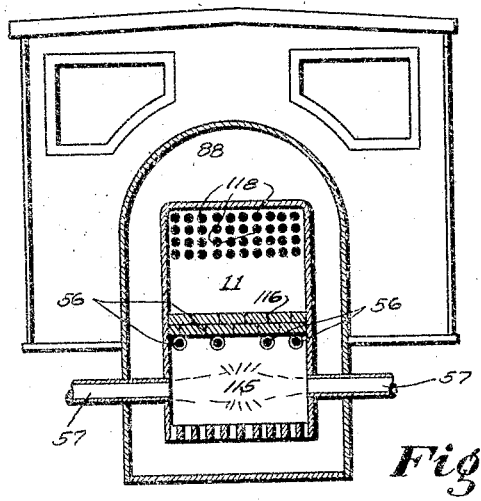
Fig. 20 is a section on the line 20—20 in Fig. 21.
Figure 21:
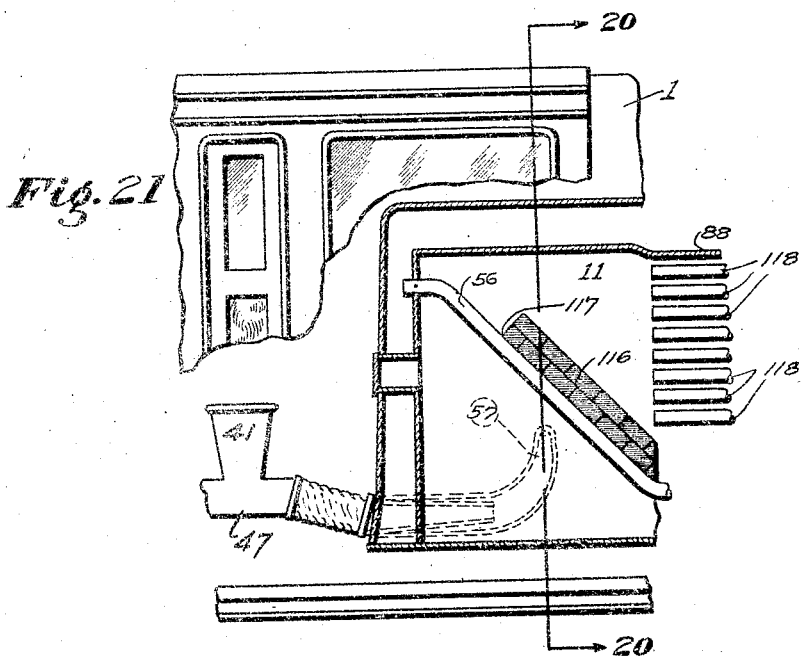
Fig. 21 is a fragmental side elevation of the engine (with the fire-box in section), showing a modified form of fire-box.

Fuel, preferably pulverized, is normally fed to the fire-box 11 of either of the alternative forms shown in Figs. 3, 20 and 21 (or any other suitable fire-box) by a mechanical stoker consisting of the endless screw 42, which is driven by the gears 50, in turn driven by beveled gears 51, so mounted in connection with gears 52 or otherwise as to be driven by gears 53 or otherwise by the rotation of one of the axles 54 of the tender-trucks.

Fig. 3 represents the preferred form of fire-box, through the nozzles 55 of which powdered fuel is blown into fire-box 11. The nozzles 57 in Figs. 20 and 21 serve the same function as nozzles 55 in Fig. 3.

The powdered fuel being drawn through the nozzles 55 strikes the arch or flame-breaker 113 (Fig. 3). Said fuel being ignited by the flame in the fire-box, combustion results, breaking over the tip of the arch at 114. In Figs. 20 and 21 the powdered fuel is fed the same as described in connection with Fig. 3, but as it enters the fire-box 11 through nozzles 57 the fuel has no abutment against which to strike. Therefore, as the nozzles are directly in line with each other, the fuel meets about the center of the fire-box where the combustion occurs (as shown at 115 in Fig. 20). Said combustion breaks over the firebrick arch 116 at the point 117. Superheated steam tubes 56 are coiled and run in a plurality to support the brick arch 116 and also to get the benefit of the maximum heat temperature. These tubes 56 are connected to the superheating coils 118. Tubes 56 being placed in the intense heat of the fire-box causes the more rapid generation of steam and helps to keep a more rapid circulation of water through syphoning effect from the dead water line of the boiler to the top of the crown sheet (not shown in the drawings).

The cone 18 in turbine 6 in its rotation carries with it at the center a driving shaft 7, which is exactly the center of the truck turntable. This is essential, as the worm wheel revolves around the worm when the truck-wheels 4 take the contour of the roadway, i. e., follows curves.

Figure 11:
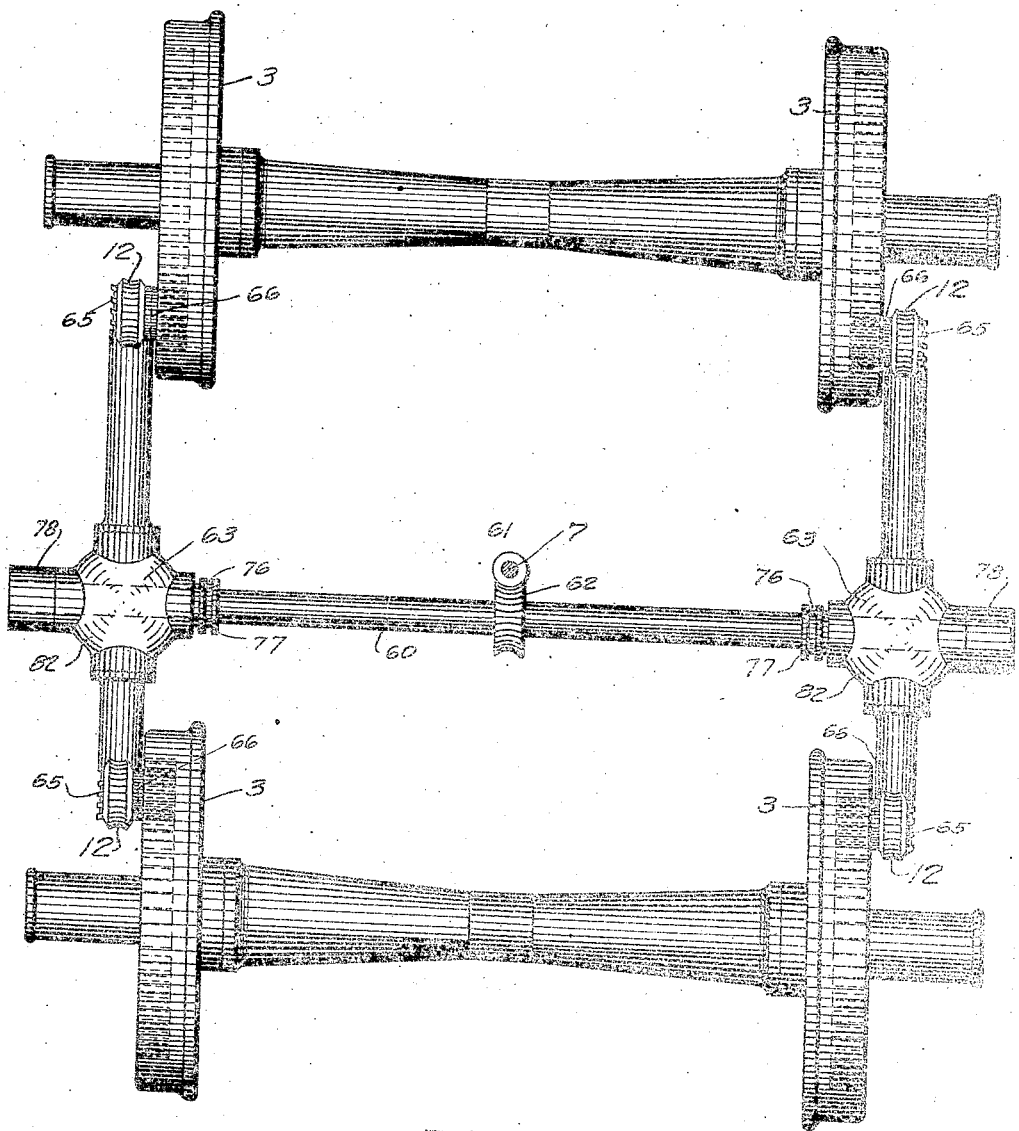
Fig. 11 is a top plan view of the tender and pony trucks showing the gear-driving mechanism on the side opposite the flange of the wheels.

Shaft 7 terminates either (as shown in Fig. 22) in a beveled pinion 58, which meshes with a beveled gear 59, the latter mounted on shaft 60, or in a worm wheel 62, as shown in Figs. 11 and 12, in engagement with worm 61 mounted on shaft 7.

Shaft 60 drives differentials 63, which actuate shafts 64, each of the said shafts having upon its ends worms 65, which actuate worm-wheels 12 with which pinions 66 are integrally formed, which pinions run in engagement with internal gears 67 on wheels 68, and thereby rotate wheels 68. The wheels 68 are part of the trucks 3 and 4.

As the locomotive 1 is intended to run in either direction, i. e., either forward, to the right in Fig. 1, or to the left in Fig. 1, the engineer must have control of the direction in which differentials 63 are driven, and this is provided by lever 70 connected to operate simultaneously with the ordinary reverse lever of a locomotive engine.

The lever 70 is pivoted to and moves rod 71 in either direction, the said lever being pivoted at 72 to part 69 of the main frame. Rod 71 is pivoted at 73 to clutch-levers 74, which are pivoted at 75 to any suitable support such as a bracket depending from the frame of the truck.

The clutch-levers 74 engage in the grooves 76 of clutches 77, and move the said clutches 77 in either direction according to the direction in which lever 70 is moved. Hubs 78 are outboard bearings for the shaft 60 and are in any suitable manner (not shown in the drawings) supported from the truckframe. Gears 79 and 80 are selectively caused to engage with the gears 83 at a right angle thereto in differential 63 by the movement or position of lever 70.

The clutches 77 and their associated parts are illustrated on an enlarged scale in Figs. 17, 18 and 19.

The gears 83 at a right angle to gears 79 and 80 in differentials 63 are keyed to shafts 64 or fixed thereto by set-screws 81. The differential housings 82 inclose gears 79, 80 and 83.

When the lever 70 is shifted in one direction, one of the gears 79 and the gear 80 on the opposite side of the locomotive 1 are frictionally engaged by a bevel 84 (as shown in Fig. 17) on clutch-member 77, and when the lever 70 is moved in the opposite direction the other gear 79 and the other gear 80 are so shifted that they become frictionally engaged with the opposite bevels 84 on each clutch 77.

In Fig. 17, such engagement is depicted at the lower end of the drawing and non-engagement at the upper end, the space 85 denoting such detachment.

Cuts 86 in the beveled parts 84 of clutch 77 permit compression and expansion and insure tight frictional engagement with the beveled parts 87 of the gears 79 and 80.

Figure 16:
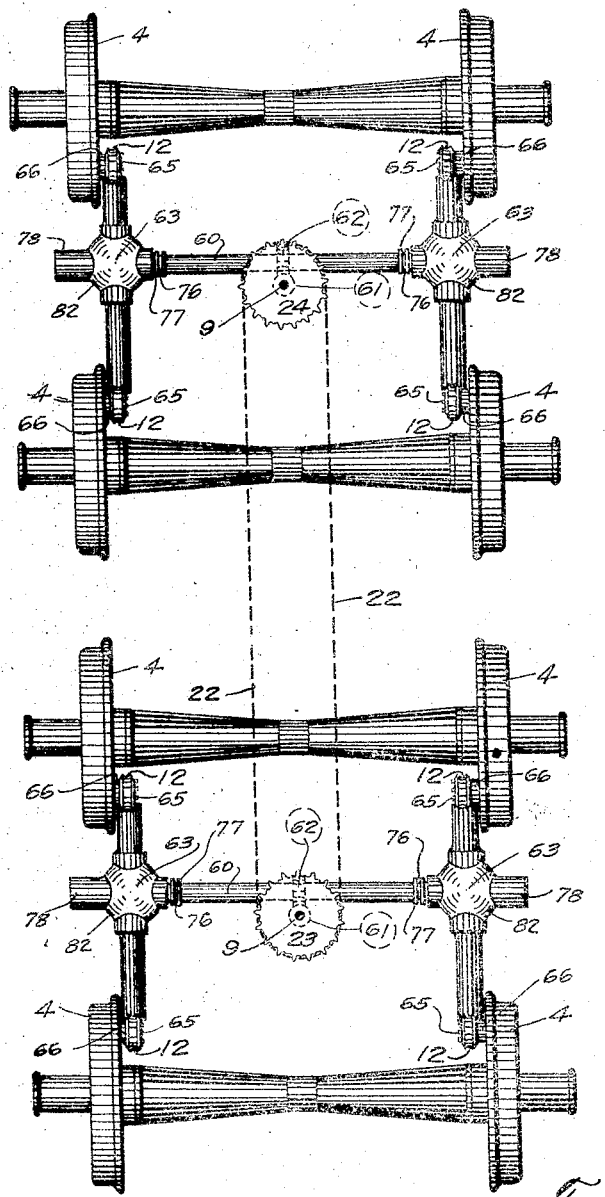
Fig. 16 is a top plan view of the tender driving trucks, illustrating the transmission of power from one to the other.

Figs. 11, 14 and 15 depict a longer shaft 60 than Fig. 12 and an arrangement in which the internal gears 67, pinions 66, worm-wheels 12, worms 65, shafts 64, etc., are on the exterior of wheels 68, while in Figs. 12 and 16 they are on the interior.

In a geared truck such as heretofore described the reversing motion of the wheels is accomplished without disengaging the gears, thus avoiding breaking of gear teeth and the familiar noises of accompanying shifting gears. By shifting the reverse lever 70 to the center position, it moves the clutch 77 likewise, thus disengaging both gears 79 and 80, allowing the turbine to run for the making of electricity or compressed air, while the locomotive is stationary.

By referring to Fig. 1, it will be seen that shaft 9 of turbine 8 (which correspond in their action and associated parts to shaft 7 of turbine 6, heretofore described in connection with lever 70, shaft 60, differentials 63, etc.) actuates only one set of wheels 68, leaving the other quartet to be otherwise driven. This is done by means of sprocket chain 22, as shown in Fig. 16, or by other similar means as hereinbefore described.

The distance between the end of the reverse lever handle 119 and the center of fulcrum 72, being proportioned to the distance from the center of fulcrum 72 to the connecting pivot point 120 of rod 71 and reverse lever 70, affords tremendous power and tightening effect on the clutch 77 which clamps gears 79 and 80 to shaft 60.

It is also essential, due to the gearing, that worms 65 be of opposite hand, so that wheels 4 run in the same direction.

The exhaust from turbine 8 is into the steam condenser and water cooler 100, shown in Figs. 4 and 6, the said exhaust passing through pipes 101 thereinto. The condenser 100 is formed of a plurality of square pipes 102, arranged as shown in Figs. 4 and 6, which, by reason of their form and arrangement, and particularly because of the serpentine course that the steam is obliged to pursue therethrough, as indicated by the arrows in Fig. 4, cause condensation of the steam and its cooling because of the large area of pipe through which it passes before it reaches the exit, which is into pipe 39 that leads to the filter 43 shown in Fig. 25 and, also, because of the draft that flows among the pipes 102 when the locomotive is in motion, which draft is enhanced by the hood 111 that incloses the said pipes 102 except at their ends.

The water formed by the condensation of steam in the condenser 100 is purified in filter 43. As shown in Fig. 25, this filter or purifier 43 consists of three compartments constructed of any suitable material with walls 129 and partitions 130 and 131. In this first compartment 126 is inserted crushed copper glance, the second charcoal, and the third crushed lime rock.

The water from the condenser 100 flows through pipe 39 and, following the arrows, filter 43, as indicated in Fig. 25, passes through the crushed copper glance of compartment 126 to an orifice 132 in partition 130, to compartment 127, and by action of gravity travels downward passing through the charcoal of the said compartment, then through the orifice 133 in partition 131, where it rises through compartment 128, said compartment being filled with crushed lime rock, and flowing outward through the pipe 45 to the water reservoir 103, from which it is pumped by pump 104 as distilled water to the boiler 88. This filtering of water does away with any sediment or residue that is commonly known in boilers and does away with cleaning or blowing out of boiler tubes, which is a great advantage over the present boiler.

It will be understood that both steam condenser 100 and water reservoir 103 may be located at any suitable place on the locomotive 1 and may be borne or supported thereby in any suitable manner.

Pump 104 is actuated by an eccentric 121, which is pivotally connected to the walking-lever 122, said lever 122 being fulcrumed at 123 and connected pivotally to the piston-rod 124 of pump 104 at 125.

When the steam, as heretofore described, has operated the locomotive and has passed through the condenser 100 after having been made dry by its humidity being there taken out, it passes through pipe 134 to steam coupling 99. The object of this said coupling is to be able to connect the cars together through the well-known M. C. B. coupler and to have this steam-coupling so arranged as to automatically connect or disconnect itself and to hold its compression by means of springs 135 as shown in Fig. 5, so that said coupling will not leak. This also obviates the necessity of going from car to car to connect or disconnect steam-couplings. A further object is so to arrange the steam-coupler that when the locomotive or cars take the curve of the roadway, the coupling will automatically adjust itself through springs 135. The coupler 99 consists of two conical shells 136, in which are steam passages 137. Ball sockets 138 are held against the interior of conical shells 136 by action of spring 135. Ball sockets 138 have steam passages cored centrally at 139.

One object of the turbines 6 and 8 and their vacuum fans 36 is to create a draft from and through the fire-box, taking by suction any back pressure from the cylinders 5 and the piston blades 140 of turbines 6 and 8 and creating an additional vacuum in the turbine 8, giving the same condition that is caused by the jet condenser in the well-known stationary engine. A further object is to draw all smoke, cinders, and sparks through the vacuum fan 36 and to keep a more even draft, just the necessary draft to create and regulate a perfect blaze, in the fire-box and through the flues of the locomotive.

The conical piston 18 is hollow-cast of shell shape, and is rigidly secured by a key or other means at its smaller diameter to the turbine shaft 7 by means of hub 141. Said piston 18 bears on the thrust-balls 142, these balls operating in the ball-race 34 and the groove 35 in the usual manner. Ball-race 34 is conveniently secured to pedestal 29, and said pedestal is bolted to cup 28 of the conical cylinder 144.

Piston compression blades 145 are helical in form and may be of any desired pitch. Said blades 145 are held against the highly ground surface of the conical cylinder 144 at 146 by means of flat zigzag spring 147, said spring 147 being tempered to hold blades 145 in a fixed position against the said surface 146.

When it becomes necessary to condense the smoke, which is drawn into the chamber 148, by the fan 36, transformation of the smoke may be made at will by the manipulation of a single key 168, which secures the fan 36, the governor 14, and the governor plate 153 to the shaft 7 of the turbine 6.

After the smoke has been drawn into the chamber 148 by action of fan 36 (which also draws the cinders and sparks from the fire-box, flue, or smoke-pipe 37) steam is admitted into the said chamber 148 through as many valves 154 as will properly condense said smoke, sparks, cinders, and soot by its being rapidly revolved and churned therein, so that same may be discharged through the stoker 42 back into the fire-box 11.

The fan 36 is fixed on the fan-plate 151, and the latter is borne by conical rollers 149, said rollers being mounted on the race 150 of the cylinder 144 in any common manner. Fan-plate 151 has orifices 152 through which the smoke, cinders, sparks, and soot of the fire-box are drawn into the chamber 148. The said fan-plate 151 which bears the fan 36 is, as heretofore stated, operated by the manipulation of the sliding key 168.

Valve 154 is actuated by trippers 156 of governor-plate 153 striking against lever 157 when the key 168 is inserted into the lower sliding collar 185 of the governor 14, which is fixed to the governor-plate 153, causing the governor-plate 153 to revolve with the shaft 7.

Lever 157 is fulcrumed and pinned to piston 18 at 158, and the other end of lever 157 is pivoted to the valve-rod 159 at 160. Valve-rod 159 is pivoted to valve 154 at 161, said valve being fulcrumed at 162.

When the key 168 is withdrawn the fan 36 stands still, and no smoke, cinders, sparks, and soot are drawn into the chamber 148. Likewise, when the key 168 is withdrawn, the governor 14 is not in action, and the valves 154 and 155 are closed, thereby allowing all steam to play on the blades 145.

The action of the governor is the same as the common fly-ball governor with arms 180 which carry the balls 181, said arms 180 being pivotally connected to the upper collar 182 at 183. The links 184 form the connections between the arms 180 and the lower sliding collar 185. When the key 168 is inserted into the governor 14 and governor-plate 153, it causes the governor 14 and governor-plate 153 to rotate at the same speed as the shaft 7, and the said governor 14 and governor-plate 153 carry the arms 180, balls 181, links 184, upper collar 182, and lower collar 185 around with it; and when the centrifugal force of the revolving balls 181 becomes great enough they fly outwardly and raise the lower sliding collar 185.

The said lower sliding collar 185 is fixed to the valve-plate 153 and in their combined revoluble motion trippers 156 are caused to come in contact with the levers 157, as hereinbefore stated.

The valve 155 is actuated in the same manner as the valve 154; and when said revolving and churning motion of the smoke takes place in the chamber 148 the smoke is caused to mix with the steam and to be converted into carbon dioxid, and at a certain time of rotation of the governor-plate 153 the valves 155 are opened, letting all carbon dioxid, cinders, sparks, and soot out of chamber 148, to be further mixed with the steam as it passes through exhaust pipe 20 of the turbine 6 and to be carried through pipe 21 to the strainer or spark-arrester 40, as heretofore described, the carbon dioxid escaping unnoticed.

The bearings are greased by grease-cup 163 and long hole 164 with cross drills at cap bearing 165 and pedestal 29.

The annular packing or gasket 32 is held against the lugs 166 of the piston 143 by means of spring 33, thus making a steam-tight joint so as not to allow leakage of steam around shaft 7 at this point.

Ball-race 30 is secured to the cup 28, shaft 7 revolving through both. Ball-race 27 is fixed on the truck support 26 and balls 169 roll in between race 27 and 30 in the usual manner. The function of these balls 169 is to produce a maximum friction at this point, as this is the pivotal center of the truck wheels 4.

The arrows indicate the direction of the steam in its predetermined path, as clearly shown in Fig. 22.

It will be understood by locomotive drivers and engineers that after the superheated steam has passed through the ordinary high pressure cylinders, the steam will have lost only seven per cent. (7%) of its mean effective pressure, so that when the steam enters the grooves on the turbine (instead of exhausting into the open air to create a draft), which grooves are helical for two-thirds of the circumference of the said turbine, the said steam exerts sufficient force to insure powerful rotation of the said turbine.

The steam pipes from the locomotive turbine 6 to the tender turbine 8 and the turbine 6 with its fans 36 assist in drawing the exhaust from the turbine 8, relieving therefrom any back pressure, so that the exhaust is free from the high pressure cylinders as well as from the locomotive turbine. Five-eighths of the pressure of the exhaust from the high pressure cylinders is available to rotate the tender turbine 8.

It will be understood that the interior of the shell of the turbines inclosing the cones 18 is ground or otherwise formed perfectly smooth, so that the abutments 19 will form a tight fit and wear evenly, while serving perfectly to control the steam. Any such contacting parts in the apparatus will be made of a suitable bronze alloy hardened with vanadium, so as to give a good wearing surface with the steel surface of the said shell.

The tender turbine may be so run while the locomotive is standing still as to blow powdered fuel into the fire-box, instead of the said powdered fuel being drawn thereinto, as hereinbefore described.

A locomotive constructed and operated as hereinbefore described will excel in efficiency and effect a saving of at least one-half of the fuel and one-half of the water and will do away with smoke in cities and sparks that set fire to fields, fences, and buildings along the right-of-way, which, also, obviates sparks and smoke flowing back over the train and inconveniencing the train crew and passengers and obstructing their view.

The locomotive herein described will give all the power for pulling a train that is ordinarily derived from a double- or triple-header, thus economizing, because of there being but one locomotive with only its own weight.

There is a distinct advantage in power in applying driving power to wheels located along an increased truckage. While the ordinary locomotive drives only by its driving wheels, this locomotive does not discard that ordinary form of driving, but adds to it driving the pony trucks at the extreme front of the locomotive and the two sets of tender trucks at the rear end of the combined and connected tender and locomotive. This separate driving increases the pulling power of the engine. A great advantage is acquired, also, by the superheating of the steam in the interior of the turbine cone 18 in the locomotive turbine 6, due to the draft thereinto by the adjacent fans 36 of the hot air direct from the fire-box through pipes 37.

These features may all be adapted to any locomotive now in existence and one or more of the turbines may be applied by utilizing an additional set of driving trucks on either end of the locomotive, and thus using only the exhaust steam to drive the same.

Almost three times the power will be derived from a locomotive constructed as herein described from the use of the same amount of steam in an ordinary present-day locomotive. By this construction, the heavy and tedious work of the fireman will be abolished, leaving him free to render other assistance to the engineer, such as watching the track and preventing accidents from misplaced switches or obstructions or stock upon the roadway.

It is understood that the term "differential" applied to the general parts 63 is not, strictly speaking, correct, but it is used in a general sense, as it is not desired to limit the application of power by any one form of differential or other gearing. Neither is it intended that the driving of the trucks shall be limited to the use of the exhaust steam. The idea of providing mechanism to drive the trucks of locomotive and tender is new, and particularly the idea of driving the same by turbines is new, and therefore, such turbines may themselves be driven by live superheated steam as well as exhaust steam, as herein described.

Having thus described this invention, it is obvious that many minor changes in the form, arrangement and order of parts and their materials and mode of construction may be made without departing from the spirit of this invention or the scope of the following claims.

I claim:

1. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles and a steam connection from the said cylinders to the said turbine.

2. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles and a steam connection from the said cylinders to the said turbine, a second set of truck wheels and axles therefor, a second turbine, means for connecting the said second turbine to the said second set of truck wheel axles and a steam connection from the first turbine to the second.

3. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles and a steam connection from the said cylinders to the said turbine, a second set of truck wheels and axles therefor, a second turbine, means for connecting the said second turbine to the said second set of truck wheel axles, a steam connection from the first turbine to the second, a third set of truck wheels and axles and means for driving the same from the second set.

4. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles, a steam connection from the said cylinders to the said turbine, a second set of truck wheels and axles therefor, a second turbine, means for connecting the said second turbine to the said second set of truck wheel axles, a steam connection from the first turbine to the second, and a steam condenser connected with the exhaust from the said second turbine.

5. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles, a steam connection from the said cylinders to the said turbine, a second set of truck wheels and axles therefor, a second turbine, means for connecting the said second turbine to the said second set of truck wheel axles, a steam connection from the first turbine to the second, a steam condenser connected with the exhaust from the said second turbine, and a water filter connected to the said condenser and through which the water from the said condenser is adapted to flow.

6. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles, a steam connection from the said cylinders to the said turbine, a second set of truck wheels and axles therefor, a second turbine, means for connecting the said second turbine to the said second set of truck wheel axles, a steam connection from the first turbine to the second, a steam condenser connected with the exhaust from the said second turbine, a water filter connected to the said condenser and through which the water from the said condenser is adapted to flow, and a pump for returning the said water to the boiler.

7. In a locomotive, the combination of a furnace, a boiler, customary driving wheels, customary driving cylinders and pistons and means for connecting the same to the said driving wheels, truck wheels and axles therefor, a turbine, means connecting said turbine to the said truck wheel axles, a steam connection from the said cylinders to the said turbine, a second set of truck wheels and axles therefor, a second turbine, means for connecting the said second turbine to the said second set of truck wheel axles, a steam connection from the first turbine to the second, and a pipe leading from the said second turbine throughout the train whereby the exhaust steam from the said second turbine is adapted to heat the train.

8. In a locomotive, the combination of a furnace, a boiler, customary driving wheels, customary driving cylinders and pistons and means for connecting the same to the said driving wheels, truck wheels and axles therefor, a turbine, means connecting the said turbine to the said truck wheel axles, a steam connection from the said cylinders to the said turbine, a second set of truck wheels and axles therefor, a second turbine, means for connecting the said second turbine to the said second set of truck wheel axles, a steam connection from the first turbine to the second, and a pipe leading from the said second turbine throughout the train whereby the exhaust steam from the said second turbine is adapted to heat the train, there being flexible valve connections intermediate the cars of the train and connecting the car portions of the said last mentioned pipe.

9. In a locomotive, the combination of ordinary steam driving mechanism and auxiliary driving mechanism, the latter being composed of a turbine and steam connections therefor, and driving connections between the same and the pony trucks.

10. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the truck wheels, and means connecting the shaft driven by the said turbine shaft to the said internal racks and adapted to drive the wheels containing the said racks.

11. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the truck wheels, and means connecting the shaft driven by the said turbine shaft to the said internal racks and adapted to drive the wheels containing the said racks, the said means consisting in differential shafts projecting therefrom in opposite directions toward the said truck wheels and a pinion located on each of the said shafts and adapted to engage the said racks.

12. In a locomotive, the combination of ordinary driving mechanism and auxiliary driving mechanism, the latter being composed of a turbine and steam connections therefor, and driving connections between the same and the pony trucks, the said last mentioned connections comprising an extension from the said turbine, a main shaft driven by the said turbine, a shaft, a worm or gear connection between the said two shafts, racks internal to the respective peripheries of the said truck wheels, and means connecting the shaft driven by the said turbine shaft to the said internal racks and adapted to drive the wheels containing the said racks, the said means consisting in a slidable clutch member loosely mounted on the said shaft in connection with the said turbine shaft, a pair of oppositely facing gears adapted non-simultaneously to be frictionally engaged by the said slidable clutch member, a pair of gears adapted to be engaged by either of the said last mentioned pair of gears, namely, the one temporarily in frictional contact with the said clutch member, a shaft adapted to be driven by each of the said second mentioned pair of gears, a pinion driven by each of the said shafts and an internal peripheral rack on each of the truck wheels, the said rack being adapted to coöperate with the said pinion.

13. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the said truck wheels, and means connecting the shaft driven by the said turbine shaft to the said internal racks and adapted to drive the wheels containing the said racks, the said means consisting in a slidable clutch member loosely mounted on the said shaft in connection with the said turbine shaft, a pair of oppositely facing gears adapted non-simultaneously to be frictionally engaged by the said slidable clutch member, a pair of gears adapted to be engaged by either of the said last mentioned pair of gears, namely, the one temporarily in frictional contact with the said clutch member, a shaft adapted to be driven by each of the said second mentioned pair of gears, a pinion driven by each of the said shafts and an internal peripheral rack on each of the truck wheels, the said rack being adapted to coöperate with the said pinion, and means for shifting the said clutch member.

14. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the said truck wheels, and means connecting the shaft driven by the said turbine shaft to the said internal racks and adapted to drive the wheels containing the said racks, the said means consisting in a slidable clutch member loosely mounted on the said shaft in connection with the said turbine shaft, a pair of oppositely facing gears adapted non-simultaneously to be frictionally engaged by the said slidable clutch member, a pair of gears adapted to be engaged by either of the said last mentioned pair of gears, namely, the one temporarily in frictional contact with the said clutch member, a shaft adapted to be driven by each of the said second mentioned pair of gears, a pinion driven by each of the said shafts and an internal peripheral rack on each of the truck wheels, the said rack being adapted to coöperate with the said pinion, and means for shifting the said clutch member, there being a duplication of the said clutch member and gears, shafts and pinions actuated thereby, and the said clutch shifting means having members adapted to shift both clutches simultaneously, the said means being operable from the engine cab.

15. In a locomotive, the combination of ordinary driving mechanism and auxiliary driving mechanism, the latter being composed of a turbine and steam connection therefor, and driving connections between the same and the pony trucks, the said last mentioned connections comprising an extension from the main shaft driven by the said turbine, a shaft, a worm or gear connection between the said two shafts, racks internal to the respective peripheries of the said truck wheels, and means connecting the shaft driven by the said turbine shaft to the said internal racks and adapted to drive the wheels containing the said racks, the said means consisting in a suitable clutch member having compression and expansion slits therein loosely mounted on the said shaft in connection with the said turbine shaft, a pair of oppositely facing gears adapted non-simultaneously to be frictionally engaged by the said slidable clutch member, a pair of gears adapted to be engaged by either of the said last mentioned pair of gears, namely, the one temporarily in frictional contact with the said clutch member, a shaft adapted to be driven by each of the said second mentioned pair of gears, a pinion driven by each of said shafts and an internal peripheral rack on each of the said truck wheels, the said rack being adapted to coöperate with the said pinion, and means for shifting the said clutch member, there being a duplication of the said clutch member and gears, shafts and pinions actuated thereby, and the said clutch shifting means having members adapted to shift both clutches simultaneously, the said means being operable from the engine cab.

16. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the truck wheels, and means connecting the shaft driven by the said turbine shaft to the said internal racks and adapted to drive the wheels containing the said racks, the said means being located between a pair of truck axles and consisting of a shaft substantially parallel to the said axles and four shafts at substantially a right angle thereto, each of the four last mentioned shafts having a gear portion thereon, a pinion in engagement with the said gear portion and a peripheral rack internal of the truck wheels adapted to be driven by the said pinion.

17. In a locomotive, the combination of ordinary driving mechanism and auxiliary driving mechanism, the latter being composed of a turbine and steam connections therefor, and driving connections between the same and the pony trucks, the said last mentioned connections comprising an extension from the main shaft driven by the said turbine, a shaft, a worm or gear connection between the said two shafts, racks internal to the respective peripheries of the truck wheels, and means connecting the shaft driven by the said turbine shaft to the said internal racks and adapted to drive the wheels containing the said racks, the said means being located between a pair of truck axles and consisting of a shaft substantially parallel to the said axles and four shafts at substantially a right angle thereto, each of the four last mentioned shafts having a gear portion thereon, a pinion in engagement with the said gear portion and a peripheral rack internal of the truck wheels adapted to be driven by the said pinion, a pair of slidable clutch members mounted on the said parallel shaft, gears adapted to be actuated thereby, gears upon the said shaft at a right angle adapted to be actuated by the last mentioned gears, and means for shifting the said clutch members and thereby alternating the gears which the same are adapted to actuate according to the direction in which the locomotive is to run.

18. In a locomotive, the combination of ordinary steam producing means, ordinary driving wheels and driving means, a turbine having steam connections with the ordinary driving means, a separate exhaust from the said turbine, a fan for drawing hot air from the furnace to the said turbine, a pipe conducting the exhaust steam from the said turbine and a spark arrester located in the said pipe.

19. In a locomotive, the combination of ordinary steam producing means, ordinary driving wheels and driving means, a turbine having steam connections with the ordinary driving means, a separate exhaust from the said turbine, a fan for drawing hot air from the furnace to the said turbine, a pipe conducting the exhaust steam from the said turbine, a spark arrester located in the said pipe, an opening out of the said pipe being located in juxtaposition to the said spark arrester, and an endless conveyer located underneath the said opening and traveling toward the fire box.

20. In a locomotive, the combination of ordinary steam producing means, ordinary driving wheels and driving means, a turbine having steam connections with the ordinary driving means, a separate exhaust from the said turbine, a fan for drawing hot air from the furnace to the said turbine, a pipe conducting the exhaust steam from the said turbine, a spark arrester located in the said pipe, an opening out of the said pipe being located in juxtaposition to the said spark arrester, an endless conveyer located underneath the said opening and traveling toward the fire box, and an endless conveyer adjacent to the said spark arrester adapted to keep the same free from cinders and to deposit the same through the said opening upon the said endless conveyer.

21. In a locomotive, the combination of a furnace, a boiler, driving wheels, steam cylinders, means for driving the said driving wheels from the said steam cylinders, pony trucks, a turbine engine adapted to drive the said pony trucks and steam connections from the said boiler to the said cylinders and to the said turbine, consisting of a pipe adapted to emit steam from the said boiler, a connection therefor to one of the said cylinders, a pipe leading therefrom toward the turbine and having a valve therein adapted to close the same, and a duplication of the said parts adapted to work when the said first mentioned pipe toward the turbine is closed by its valve.

22. A locomotive having a turbine as part of its driving mechanism, means for driving its pony trucks from the turbine, and means for applying the turbine power equally to each of the pony truck wheels.

23. A locomotive having ordinary steam driving mechanism and means for driving its pony trucks, consisting of a turbine and connections.

24. A locomotive having ordinary driving mechanism and means for driving its pony trucks, consisting of a turbine, the said turbine being in geared connection with the said trucks.

25. A locomotive turbine having a central shaft, means in connection with the said shaft for driving the locomotive wheels, a truncated cone fixed to the said shaft, the said cone having grooves in its periphery and means for the inlet and exhaust of steam, and means for drawing heat from the fire box to super-heat the steam in the said turbine.

26. A locomotive having main steam driving gear and auxiliary motive power comprising a steam turbine geared to one of the locomotive trucks and adapted to be driven by the exhaust steam from said main steam driving gear.

27. A locomotive having main steam driving mechanism and a steam turbine as auxiliary motive mechanism.

28. A locomotive, comprising steam-making means, ordinary driving mechanism, auxiliary driving mechanism consisting of a turbine having grooves in its surface, means leading from the said ordinary driving means to the said turbine adapted to discharge steam tangentially into the grooves upon the surface of the said turbine, the said turbine being hollow, a valve for admitting steam within the said turbine, and means for exhausting the steam therefrom.

29. A locomotive, comprising steam-making means, ordinary driving mechanism, auxiliary driving mechanism consisting of a turbine having grooves in its surface, means leading from the said ordinary driving means to the said turbine adapted to discharge steam tangentially into the grooves upon the surface of the said turbine, the said turbine being hollow, a valve for admitting steam within the said turbine, a governor and governor-controlled means for exhausting the steam therefrom.

30. In a locomotive, the combination of ordinary driving means, a tender connected to the locomotive, a turbine upon the locomotive and another turbine upon the tender, steam connections from the ordinary driving means to the first-mentioned turbine, suction means connected with the second mentioned turbine for drawing steam from the first mentioned turbine to the second mentioned turbine, a shaft for each of the said turbines, and means connecting the said turbines to the truck wheels respectively adjacent thereto.

31. A locomotive, comprising ordinary driving wheel mechanism, pony trucks and two sets of tender trucks, ordinary high pressure steam cylinders, a turbine at the front end of the said locomotive and a turbine on the said tender pipes for carrying steam from both the said high pressure cylinders to opposite sides of the said locomotive turbine and adapted to inject steam thereagainst, helical grooves in the surface of the said turbine adapted to receive the said injected steam and thereby to cause rotation of the said turbine, a shaft in fixed connection with the said turbine, exhaust pipes leading from the said turbine to the said tender turbine, the said tender turbine being provided with peripheral helical grooves like the said first-mentioned turbine and the said pipes being adapted to allow the injection of the said exhaust steam from the first-mentioned turbine into the grooves of the second mentioned turbine, a shaft in fixed connection with the said second mentioned turbine, and means for driving the tender truck wheels from the said second mentioned turbine, and means for driving the pony trucks from the locomotive turbine.

32. A locomotive, comprising ordinary driving wheel mechanism, pony trucks and two sets of tender trucks, ordinary high pressure steam cylinders, a turbine at the front end of the said locomotive and a turbine on the said tender pipes for carrying steam from both the said high pressure cylinders to opposite sides of the said locomotive turbine and adapted to inject steam thereagainst, helical grooves in the surface of the said turbine adapted to receive the said injected steam and thereby to cause rotation of the said turbine, a shaft in fixed connection with the said turbine, exhaust pipes leading from the said turbine to the said tender turbine, the said tender turbine being provided with peripheral helical grooves like the said first-mentioned turbine and the said pipes being adapted to allow the injection of the said exhaust steam from the first-mentioned turbine into the grooves of the second mentioned turbine, a shaft in fixed connection with the said second mentioned turbine, and means for driving the tender truck wheels from the said second mentioned turbine, and means for driving the pony trucks from the locomotive turbine, the said means consisting of suitable gears.

33. A locomotive, comprising ordinary driving wheel mechanism, pony trucks and two sets of tender trucks, ordinary high pressure steam cylinders, a turbine at the front end of the said locomotive and a turbine on the said tender pipes for carrying steam from both the said high pressure cylinders to opposite sides of the said locomotive turbine and adapted to inject steam thereagainst, helical grooves in the surface of the said turbine adapted to receive the said injected steam and thereby to cause rotation of the said turbine, a shaft in fixed connection with the said turbine, exhaust pipes leading from the said turbine to the said tender turbine, the said tender turbine being provided with peripheral helical grooves like the said first-mentioned turbine and the said pipes being adapted to allow the injection of the said exhaust steam from the first-mentioned turbine into the grooves of the second mentioned turbine, a shaft in fixed connection with the said second mentioned turbine, and means for driving the tender truck wheels from the said second mentioned turbine, and means for driving the pony trucks from the locomotive turbine, the said means consisting of suitable gears, there being extension means from one set of tender trucks to the other set for driving the latter from the former.

34. In a locomotive, the combination of a fire-box, a boiler, high pressure cylinders, ordinary driving mechanism, a turbine adapted to drive the pony truck wheels, suction means located adjacent to the said turbine, a pipe leading from the said fire-box to the said suction means, there being an opening between the said suction means and the interior of the said turbine, a wall surrounding the said turbine, steam pipes leading from the said high pressure cylinders to the interior of the said wall, the said turbine being conical in form and having helical grooves in its surface, the said steam pipes being so arranged as to direct the steam into the said helical grooves, which by their shape are adapted to impart rotary motion to the said turbine, a shaft adapted to be rotated by the said turbine, a valve adapted to admit steam from one of the said grooves into the interior of the said turbine, another valve adapted to allow the exit of the said steam and a governor adapted to control both of the said valves.

35. In a locomotive, the combination of a fire-box, a boiler, high pressure cylinders, ordinary driving mechanism, a turbine adapted to drive the pony truck wheels, suction means located adjacent to the said turbine, a pipe leading from the said fire-box to the said suction means, there being an opening between the said suction means and the interior of the said turbine, a wall surrounding the said turbine, steam pipes leading from the said high pressure cylinders to the interior of the said wall, the said turbine being conical in form and having helical grooves in its surface, the said steam pipes being so arranged as to direct the steam into the said helical grooves, which by their shape are adapted to impart rotary motion to the said turbine, a shaft adapted to be rotated by the said turbine, a valve adapted to admit steam from one of the said grooves into the interior of the said turbine, another valve adapted to allow the exit of the said steam and a governor adapted to control both of the said valves, and exhaust means adapted to exhaust steam from the said turbine whether or not the steam is passed through its interior.

In testimony whereof I hereunto affix my signature.

FREDERICK L. McGAHAN.